R. G. TAYLOR.
DOOR OPERATING MECHANISM FOR DUMP CARS.
APPLICATION FILED NOV. 1, 1911.
1,087,616.
Patented Feb. 17, 1914.
6 SHEETS—SHEET 2.
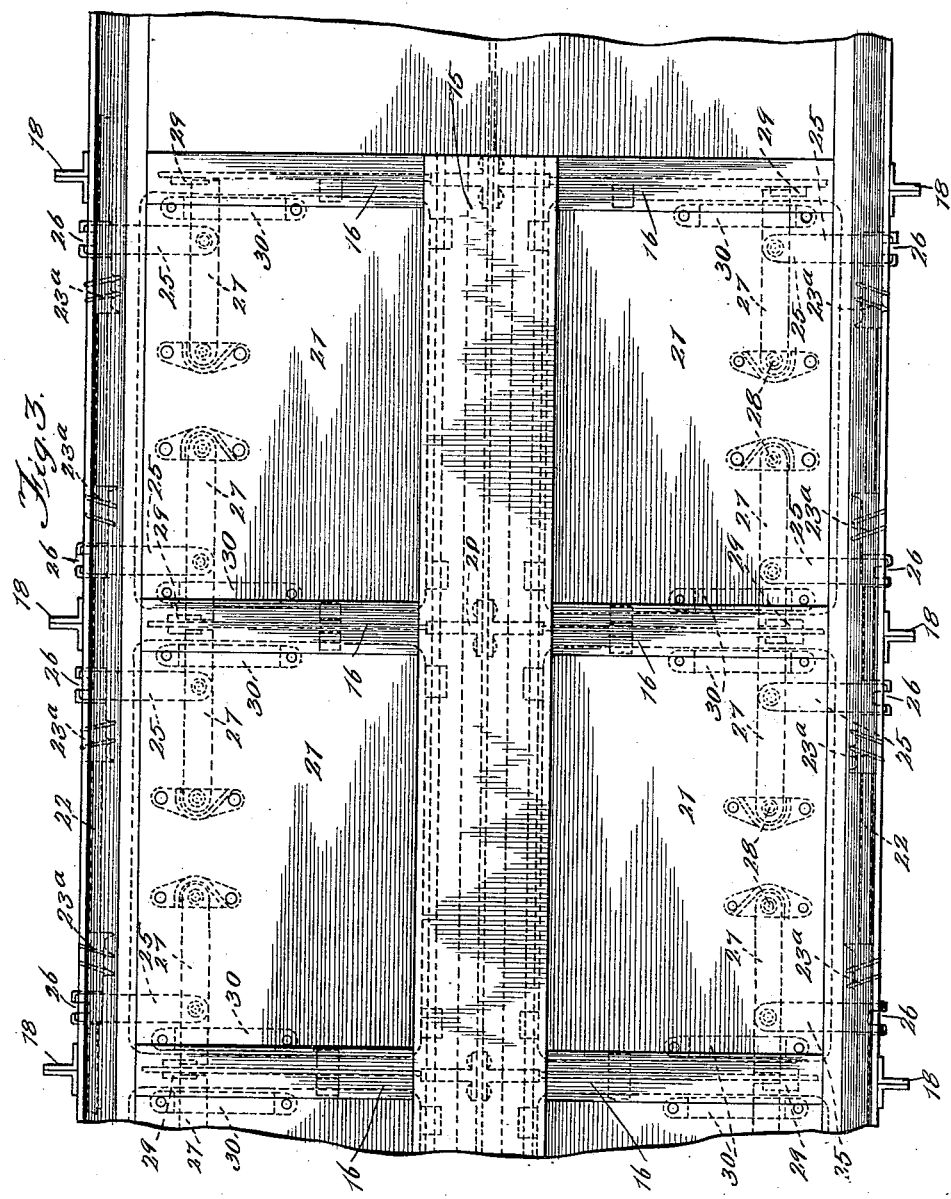

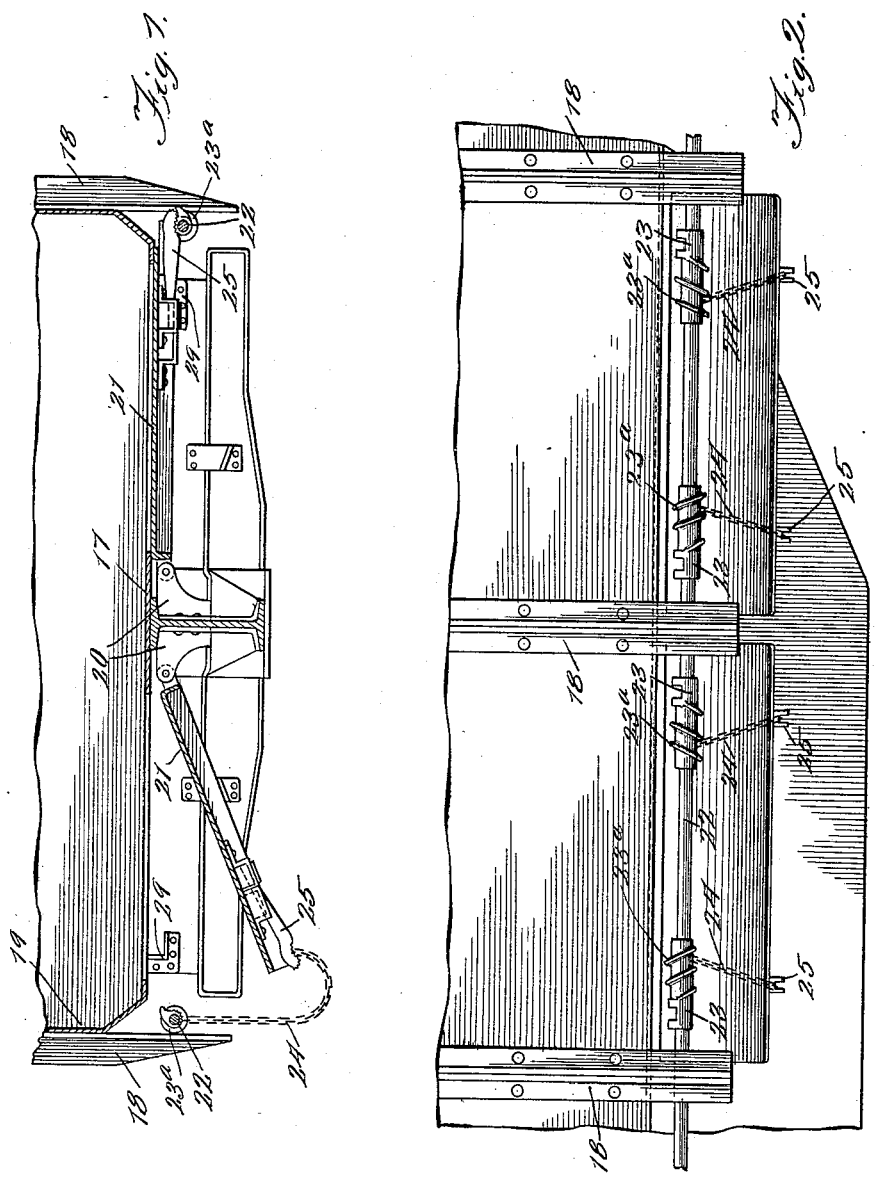

R. G. TAYLOR.
DOOR OPERATING MECHANISM FOR DUMP CARS.
APPLICATION FILED NOV. 1, 1911.

1,087,616.

Patented Feb. 17, 1914.

6 SHEETS—SHEET 3.

Witnesses:

Inventor:
Ralph G. Taylor
By Bulkley & Durand
Atty.

R. G. TAYLOR.
DOOR OPERATING MECHANISM FOR DUMP CARS.
APPLICATION FILED NOV. 1, 1911.
1,087,616.
Patented Feb. 17, 1914.
6 SHEETS—SHEET 4.
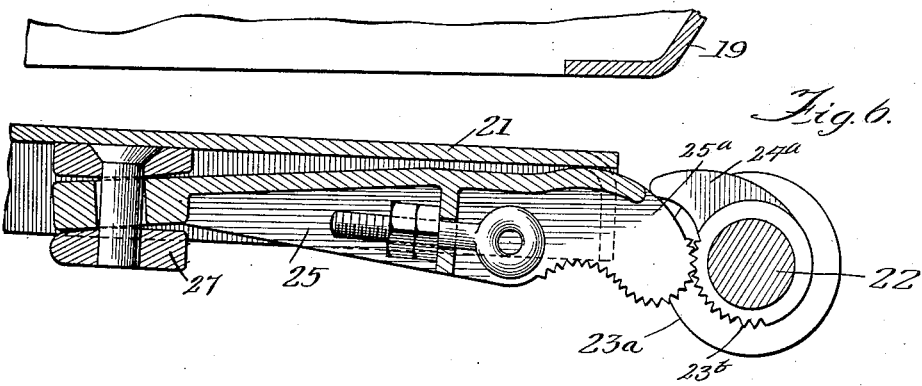
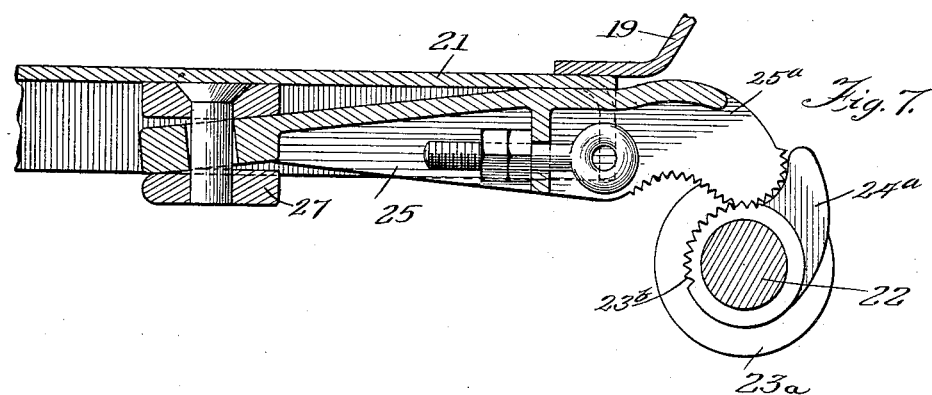
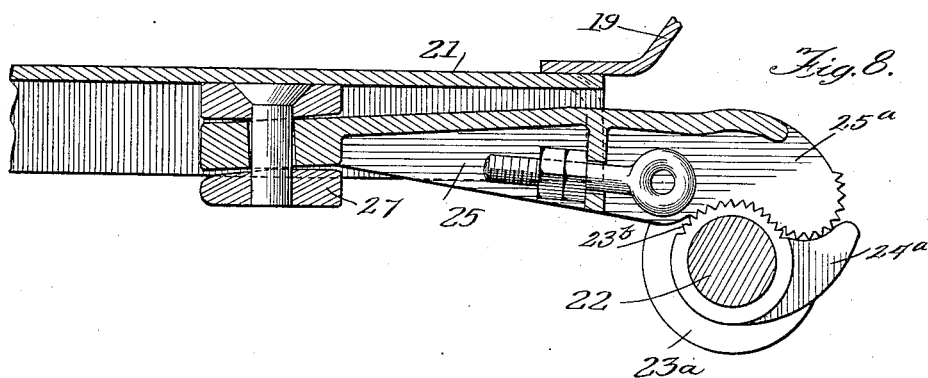
Witnesses:
Inventor:
Ralph G. Taylor
By Bulkley & Durand
Atty.

R. G. TAYLOR.
DOOR OPERATING MECHANISM FOR DUMP CARS.
APPLICATION FILED NOV. 1, 1911.

1,087,616.

Patented Feb. 17, 1914.
6 SHEETS—SHEET 5.

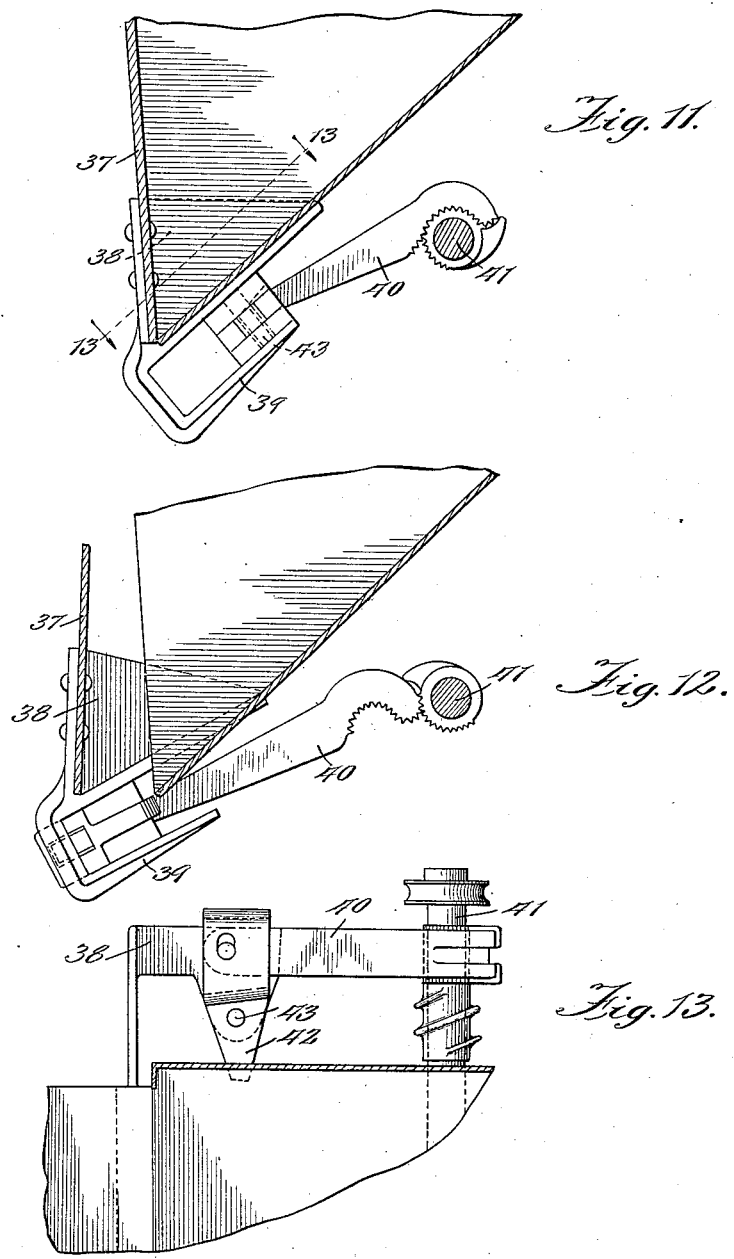

UNITED STATES PATENT OFFICE.

RALPH G. TAYLOR, OF DAVENPORT, IOWA, ASSIGNOR, BY MESNE ASSIGNMENTS, TO THE BETTENDORF COMPANY, OF BETTENDORF, IOWA, A CORPORATION OF IOWA.

DOOR-OPERATING MECHANISM FOR DUMP-CARS.

1,087,616.  Specification of Letters Patent.  Patented Feb. 17, 1914.

Application filed November 1, 1911. Serial No. 657,999.

*To all whom it may concern:*

Be it known that I, RALPH G. TAYLOR, a citizen of the United States of America, and resident of Davenport, Scott county, Iowa, have invented a certain new and useful Improvement in Door-Operating Mechanism for Dump-Cars, of which the following is a specification.

My invention relates to improved door locking mechanism for drop bottom gondola cars.

It has for its object the provision of simple and efficient locking means and one in which the weight of the door and the load carried thereby is removed from the mechanism which is employed for closing the car. Pivotally mounted arms are provided to which this weight is transferred, and the locking means is independent of the chains, so that the doors remain locked in position even though the chains should become broken.

These and other objects of my invention will be more readily understood by reference to the accompanying drawings, in which—

Figure 4:
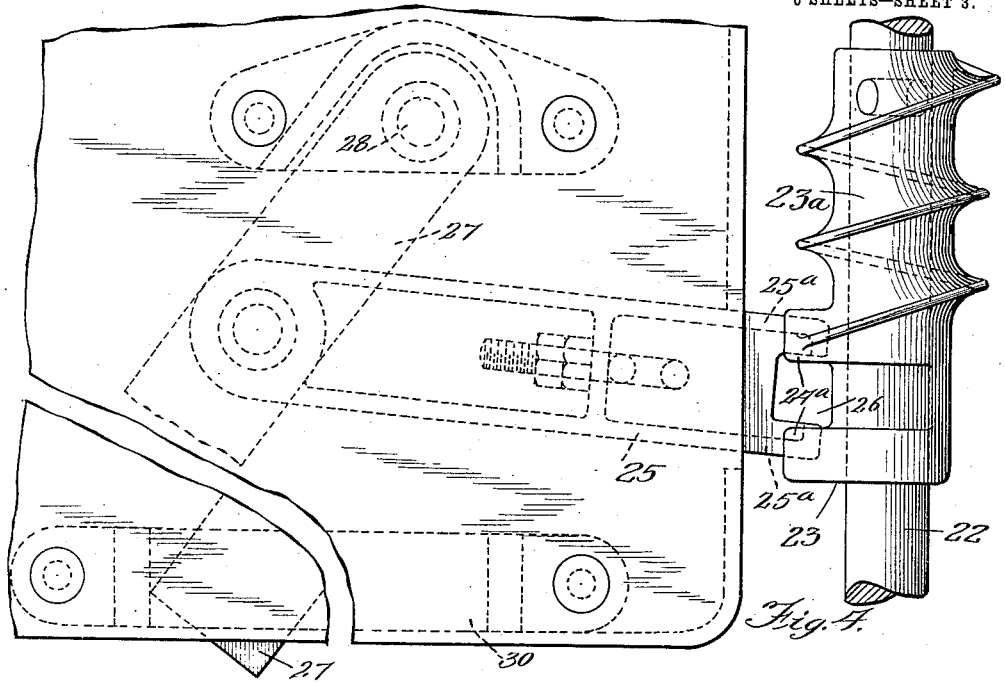
Figure 5:
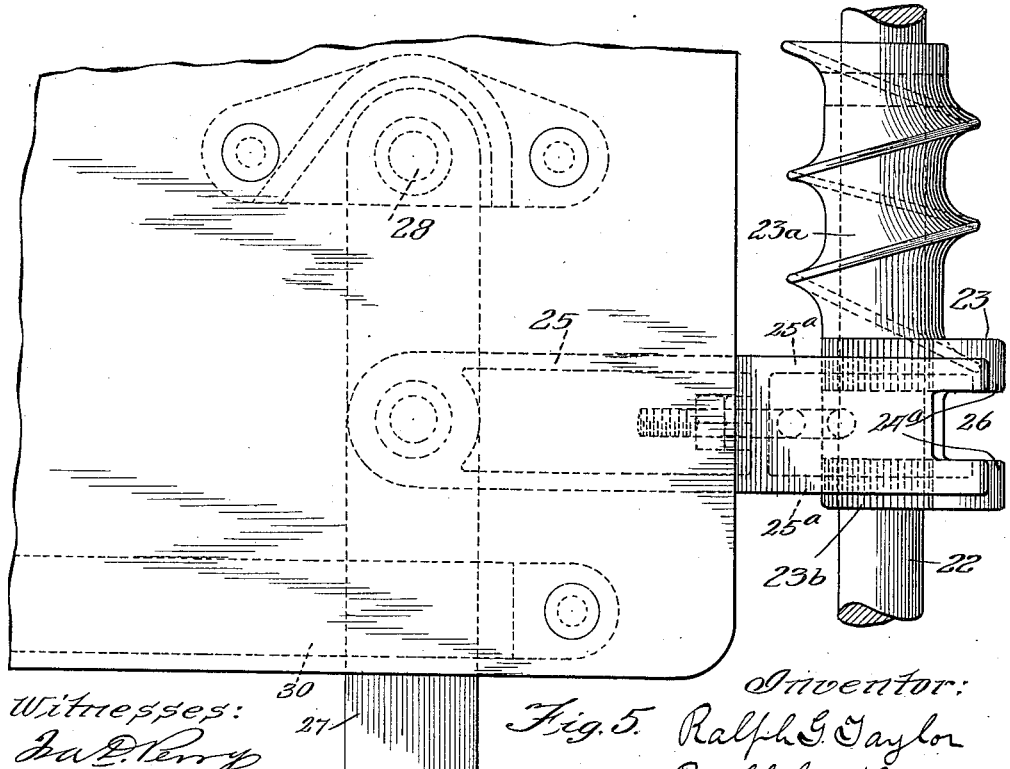
Figure 9:
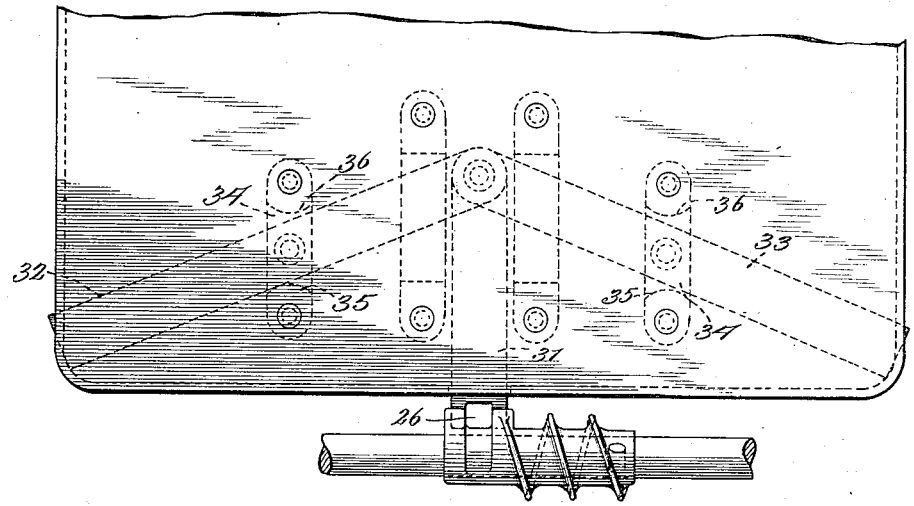
Figure 10:
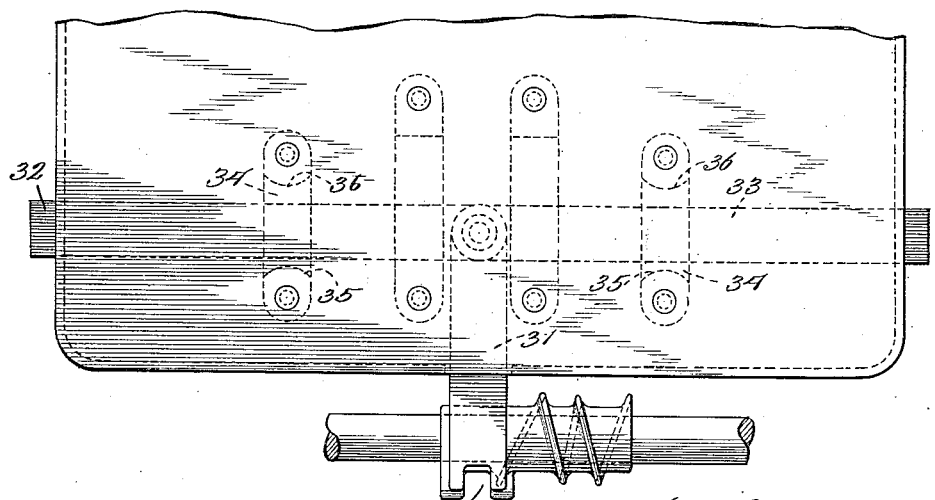

Figure 1 is a transverse sectional view of a car bottom embodying the features of my invention. Fig. 2 is a side view of the same. Fig. 3 is a plan view. Fig. 4 is a detail view showing the locking arm out of locking position. Fig. 5 is a similar view showing the locking arm in locking position. Figs. 6, 7 and 8 are sectional detail views showing different steps in the closing of a door. Figs. 9 and 10 are plan views of a modified form of my invention. Fig. 11 is a detail sectional view of a modified form of my invention, showing the application of my improved locking means to a car having a roof-shaped bottom. Fig. 12 is a sectional view of the same modification, showing the door in partially open position. Fig. 13 is a sectional view taken on line 13—13 of Fig. 11.

I have illustrated my invention in connection with a car comprising a continuous single I-beam center sill 15 and cross-bars or needle beams 16, which pass through the web of said center sill, and suitable posts 18 to which the sheet metal side walls 19 of the body are secured. A longitudinal center floor plate 17 is secured to the upper flange of the center sill. A series of knuckles 20 are mounted upon the center sill at suitable intervals between the needle beams. These knuckles carry hinges of the trap-doors 21. The width of these doors corresponds substantially to the distance between the needle beams, and the side edges of the doors bear upwardly on the flanges of the needle beams when the doors are closed.

Supported by the ends of the needle beams there is a longitudinally extending winding shaft 22 which extends longitudinally for substantially the entire length of the car, and at its end may be provided with any suitable means for operating the same. The specific means employed not being essentially a feature of my invention, it is not thought necessary to show or describe such means, as any suitable mechanism may be employed.

The winding shaft 22 is provided with a series of drums 23 which are located adjacent to the outer edges of the doors 21, there being preferably a pair of drums for each door, located on the winding shaft near opposite sides of the corresponding door. Each drum is provided with a spiral rib 23ª having a serrated end portion 23ᵇ. Upon this end portion there is mounted a pair of lugs or ears 24ª which are adapted to engage with the clevis 25 in a manner to be hereinafter more fully described. The chain 24 is secured at one end to the winding drum and wound between the spiral ribs 23ª and is connected at its opposite end with the clevis 25. This clevis, as shown more clearly in Figs. 4 to 8 inclusive, comprises an arm having a bifurcated curved end portion 26, the lower outer edge of which end portion is serrated in the manner shown. The corresponding parts of the winding drum with which this serrated end portion coacts is likewise serrated, in order to give a sufficient frictional engagement between the two parts. The chain 24 passes through this bifurcated end portion and is secured to the clevis 25 in any suitable manner. The opposite end of this clevis is pivoted to an intermediate point of the locking lever 27, which locking lever is pivoted at 28 to the under side of the door 21. Suitable brackets 29 are mounted upon the needle beams in such position that they are adapted to receive the end of the locking lever 27 when this lever is swung into locking position in a manner to be hereinafter more fully described. A strap 30 is secured to the under surface of the door and surrounds the end of the locking lever 27.

The construction and operation will be more fully understood by a description of the manner in which the door is locked in position. Assuming the door is in open position, as shown in Fig. 1, the winding shaft 22 is operated to wind up the chain 24. The chain pulls upwardly upon the door and brings it into the position shown in Fig. 6. At this point the end of the clevis 25ª bears against the portion 23ᵇ of the winding drum, which engagement causes the clevis to be forced backwardly to the position shown in Figs. 4 and 6, in which the locking lever is in unlocking position. Further operation of the winding drum draws the clevis upward and over the winding drum, as shown in Fig. 7, and finally the further operation of the drum brings the clevis into the position shown in Fig. 8. In this position of the clevis the locking lever 27 has been rotated into the position shown in Fig. 5, in which the end portion of the locking lever engages with the locking lug 29 to securely lock the door in position. The upper portion of the clevis 25 is curved in the manner shown in Figs. 6 to 8 inclusive, so that as this clevis is drawn over the drum this curved portion engages with the under surface of the door 21, so as to force this door into closed position, as shown in Fig. 7. As the clevis is drawn farther into locking position in the manner shown in Fig. 8, this curved portion of the clevis drops out of engagement with the door, owing to the fact that the end of the clevis is carried along the curved surface of the winding drum and thus moves downward after passing the vertical center line of this drum. The door, however, is held in position by the locking arm 27 in the manner described above.

It is thus clearly seen that by my locking means the entire weight of the door is taken off the locking clevis 25, this weight being carried by the brackets 29 mounted on the needle beams. This feature of my invention is very important, as it transfers the weight of the doors to the needle beams, and likewise removes all stress from the chains, so that the danger of the door swinging open, owing to the breaking of the chain, is obviated. In order to unlock the door it is merely necessary to reverse the operation of the winding shaft, in which event the ears 24ª engage with the bifurcated end portions 25ª of the clevis, and force this clevis backwardly so as to rotate the end of the locking lever 27 out of engagement with the brackets 29. The door is then free to swing downward into the position shown in Fig. 1.

In Figs. 9 and 10 I have shown a slightly modified form of my invention where, instead of a pair of winding drums, and a pair of clevises for each door, I provide but a single drum and clevis mounted in the center of the door. At the inner end of this single clevis 31 is pivoted a pair of locking arms 32—33 which pass beneath the straps 34, which straps are provided with bearing portions 35—36. In this construction, as the clevis 31 is drawn forward by the winding of the chain upon the drum in the manner described in connection with Figs. 1 to 8 inclusive, the inner end portions of the locking levers 32—33 are drawn downward, and thus the outer ends of these locking levers are forced outward into the position shown in Fig. 10, in which position they engage with corresponding lugs 29 carried by the needle beams, in the manner hereinbefore described.

In Figs. 11 to 13 inclusive, I show a still further modification of my invention, in which my locking means is adapted for use in connection with a dump car having a roof-shaped bottom. In cars of this type the bottom is provided with two inclined sections, and the doors 37 are hinged at their upper end and are adapted in opening to swing outwardly in the manner shown in Fig. 12. Carried by these doors are a pair of V-shaped castings 38, which castings extend beyond the ends of the doors in the manner shown in Fig. 13. These castings are provided with an angular bearing portion 39, which provides a bearing for the clevis 40. A winding shaft 41 is mounted in any suitable manner below the car floor, which winding shaft is similar to the corresponding shaft shown in the previous modification. The clevis 40 engages with the drum upon this winding shaft, in the manner hereinbefore described. The inner end of the clevis 40 is connected with one end of the locking lever 42, which is pivoted at 43, the opposite end of which locking lever is adapted when in locking position to pass back of the floor so as to hold the door in locked position in a manner which will be clearly understood. In unlocking the door the operation is similar to that previously described in connection with Figs. 1 to 8 inclusive, it being merely necessary to reverse the operation of the winding drum, which operation causes the locking lever 42 to move out of engagement with the floor and allow the door to be free to move into open position.

While I have shown various specific embodiments of my invention, and have shown my invention in connection with particular types of car, it will be understood that I do not wish to limit myself to such construction, as it will be obvious that many changes and modifications will readily suggest themselves to those skilled in the art.

What I claim as my invention is:

1. In a dump car, a drop door hinged at one end, means for moving said door into closed position, and a pivoted lever controlled by said means and connected thereto adapted to swing in a plane parallel to said door to lock said door in closed position.

2. In a dump car, hinged drop doors, a winding drum, a chain secured to said winding drum, means for operating said drum to move said doors into closed position, and a pivoted lever controlled by and connected to said chain and drum adapted to swing in a plane parallel to said door to lock said doors in closed position.

3. In a dump car, a hinged drop door, a locking lever pivoted to said door, means for moving said door into closed position for controlling the operation of said locking lever, and to swing the same in a plane parallel to said door into position for locking said door in closed position.

4. In a dump car, a hinged door, a lever pivoted to said door, a winding drum, a chain connected with said winding drum and said door, means controlled by said drum and chain for moving said door into closed position and for controlling the operation of said lever, to swing the same in a plane parallel to said door into position for locking said door in closed position.

5. In a dump car, a hinged door, a locking lever pivoted to said door, a clevis connected to an intermediate point of said locking lever, a chain connected with the opposite end of said clevis, means for operating said chain for moving said door into closed position, and to move said lever into position for locking said door in closed position.

6. In a dump car, a hinged door, a locking lever pivoted to said door, a clevis connected at an intermediate point to said locking lever, a winding drum, a chain connected to said clevis and said winding drum, means for revolving said winding drum to wind up said chain to bring said door into closed position, and to then move said clevis to bring said locking lever into position to lock said door in closed position.

7. In a dump car comprising a center sill and needle beams, a door hinged to said center sill, a lever mounted upon said door, a bracket, means for moving said door into closed position and then moving said lever into engagement with said bracket to lock said door in closed position.

8. In a dump car comprising a center sill and needle beams, a door hinged to said center sill, a lever pivoted to said door, a bracket, a clevis, means for operating said clevis to move said door into closed position, means controlled by the movement of said clevis for bringing said lever into engagement with said bracket to lock said door in closed position, and means for removing the weight of said door from said clevis when said door is in closed position.

9. In a dump car comprising a center sill and needle beams, a door hinged to said center sill, a lever pivoted to said door, a bracket, a clevis connected at the intermediate point of said locking lever, a winding drum, a chain connected to said winding drum and said clevis, means for operating said chain to move said door into closed position, and means for then moving said clevis into position to hold said door in closed position, thereby moving said locking lever into engagement with said bracket to lock the door in closed position.

10. In a dump car, a hinged door, a locking lever pivoted to said door, a clevis connected to an intermediate point of said locking lever, a chain connected with the opposite end of said clevis, means for operating said chain for moving said door into closed position, and to move said lever into position for locking said door in closed position, and means for removing the weight of said door from said clevis when said door is in closed position.

11. In a dump car, a hinged door, a locking lever pivoted to said door, a clevis connected at an intermediate point to said locking lever, a winding drum, a chain connected to said clevis and said winding drum, means for revolving said winding drum to wind up said chain to bring said door into closed position, and to then move said clevis to bring said locking lever into position to lock said door in closed position, and means for removing the weight of said door from said clevis when said door is in closed position.

12. In a dump car comprising a center sill and needle beams, a door hinged to said center sill, a lever pivoted to said door, a bracket, a clevis connected at the intermediate point of said locking lever, a winding drum, a chain connected to said winding drum and said clevis, means for operating said chain to move said door into closed position, means for then moving said clevis into position to temporarily hold said door in closed position, thereby moving said locking lever into engagement with said bracket to lock the door in closed position, and means for then removing the weight of said door from said clevis.

Signed by me at Davenport, Iowa, this 27th day of October, 1911.

RALPH G. TAYLOR.

Witnesses:
CHAS. J. HAMNER,
R. H. MULEHAN.